United States Patent Office 3,257,378
Patented June 21, 1966

3,257,378
INDAZOLIUM AZO DYESTUFFS
Robert Frederic Michel Sureau, Enghien-les-Bains, Georges Raymond Henry Mingasson, Paris, and Gilbert Victor Henri Kremer, Ermont, France, assignors to Etablissements Kuhlmann, Paris, France
No Drawing. Filed Feb. 12, 1963, Ser. No. 257,828
Claims priority, application France, Feb. 16, 1962, 888,295
1 Claim. (Cl. 260—157)

The present invention concerns new azo dyestuffs and processes for the preparation thereof.

In particular it relates to new basic azo dyestuffs of the general formula:

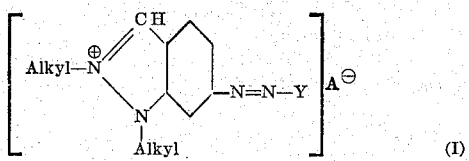
(I)

in which Y represents the residue of a coupling compound not having a sulphonic or carboxyl group, A represents a monovalent anion or its equivalent and the Alkyl groups in positions 1 and 2 of the indazole nucleus may be the same or different.

In pending patent application No. 250,772, now U.S. Patent No. 3,176,200, there have been described the salts of 1,2-dialkyl-6-amino-indazolium of the general formula:

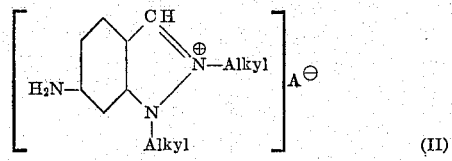
(II)

and the use of these compounds as coupling compounds in the preparation of basic azo dyestuffs of the general formula:

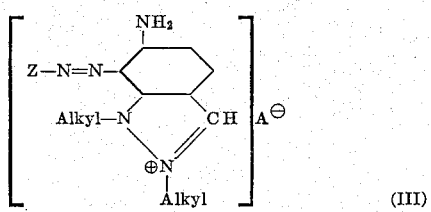
(III)

wherein Z represents the residue of a diazotizable primary aromatic or heterocyclic amine free from solubilizing groups.

It has now been found that salts of general Formula II are readily diazotized in aqueous acid solution and that the diazo compounds thus obtained react readily with coupling compounds of formula H—Y, Y having the same significance as above. These compounds may belong to very diverse classes such as the aromatic, heterocyclic or aliphatic series. They must contain at least one amino group or a phenolic or enolic hydroxyl group and in the ortho, para or alpha position to such a group, a free position for coupling. They may possibly be substituted by halogen atoms or by non-solubilizing groups such as for example alkyl, alkoxy, acylamino, carboxyl ester, carbonamido or sulphonamido groups.

These same dyestuffs are obtainable by another method of preparation which also forms part of the present invention and which comprises coupling diazo compounds of 6-amino-indazole or its 1- or 2-alkyl derivatives with the coupling compounds defined above, then treating the dyestuffs obtained, possibly in the presence of an organic solvent, with an alkylating agent such as for example dimethyl sulphate.

The dyestuffs of Formula I are generally crystalline compounds which are very soluble in water; they dye fibres based on polymers or copolymers of acrylonitrile in full-bodied shades of good general fastness covering a large part of the visible spectrum, especially yellow and bluish red.

In the following examples, to which the present invention is not limited, the parts are by weight unless the contrary is indicated.

Example 1

19.7 parts of 1,2-dimethyl-6-amino-indazolium hydrochloride are dissolved in 250 parts of water. 60 parts by volume of concentrated hydrochloric acid are added together with crushed ice in order to lower the temperature to 0° C., and a solution of 7 parts of sodium nitrite in 50 parts of water is introduced with vigorous stirring as quickly as possible. The mixture is stirred for 30 minutes at a temperature between 0° C. and 5° C., the excess nitrous acid is destroyed by just sufficient sulphamic acid, and then a solution of 12.5 parts of N-dimethylaniline in 200 parts of water to which have been added 10 parts by volume of concentrated hydrochloric acid, is introduced.

The coupling begins at once, and it is ended by introducing within an hour a solution of sodium acetate until a pH of 4.2 to 4.5 is obtained. When the diazo compound has disappeared, 100 parts of sodium chloride are added and 10 parts by volume of a 50% solution of zinc chloride are slowly introduced. The red dyestuff which is precipitated is filtered off, drained and dried in an oven. Weight obtained: 42 parts.

This dyestuff dyes fibres based on polymers or copolymers of acrylonitrile a full-bodied red orange shade which has very good general fastness.

Example 2

13.3 parts of 6-amino-indazole are dissolved in 300 parts of water and 50 parts by volume of concentrated hydrochloric acid, and the mixture is cooled to 5° C. and 14 parts by volume of 50% sodium nitrite solution are rapidly introduced. After stirring for 20 minutes at 5° C., the slight excess of nitrite is destroyed by the addition of just sufficient sulphamic acid, and the diazo solution obtained is introduced into a solution of 12.7 parts of N-dimethyl-aniline in 200 parts of water and 11 parts by volume of concentrated hydrochloric acid. The product is progressively neutralized by the addition of a solution of sodium acetate, then of ammonia, until the pH is 6 to 6.5. The precipitate is filtered off, washed with water and dried at 100° C. 25 parts of a yellow dyestuff are obtained which is soluble in dilute mineral acids giving a red solution.

11 parts of this dyestuff are introduced in small amounts at about 100° C. over a period of 15 minutes into 10 parts by volume of freshly distilled dimethyl sulphate. The mixture is heated at 100–110° C. for a further 15 minutes, 200 parts of water are added, it is heated again for a few minutes, and any insoluble impurities are filtered off. The pH of the filtrate is brought to between 4 and 4.5 by the addition of sodium acetate and, after cooling, 40 parts of sodium chloride are added, then about 5 parts of a 50% solution of zinc chloride. The dyestuff which precipitates is filtered off, drained and dried. It is identical with the dyestuff prepared according to Example 1.

Example 3

A diazo compound prepared according to the process of Example 1 with 19.7 parts of 100% 1,2-dimethyl-6-amino-indazolium hydrochloride is introduced over a period of about an hour into a solution consisting of 18 parts of 1-phenyl-3-methyl-5-pyrazolone, 400 parts of water, 10.5 parts by volume of 10 N caustic soda and 60 parts of sodium carbonate. Stirring is maintained for 2 hours after the precipitation of the dyestuff, then it is acidified by the addition of hydrochloric acid, diluted with 550 parts of water and heated to 60–70° C. to dissolve the dyestuff. Any insoluble impurities are filtered off, the solution is left to cool and the salt of the dyestuff is precipitated by the addition of sodium chloride. After filtration, draining and drying, 34 parts of a dyestuff dyeing fibers based on polymers or copolymers of acrylonitrile a yellow shade having excellent general fastness are obtained.

The following table summarizes a number of analogous examples; the dyestuffs are prepared by coupling the compounds listed below with the diazo compound of 1,2-dimethyl-6-amino-indazolium. The shades given are those obtained on fibres based on polymers or copolymers of acrylonitrile.

| No. | Coupling compound | Shade |
|---|---|---|
| 4 | N-diethylaniline | Scarlet. |
| 5 | N-diethyl-m-toluidine | Vermilion. |
| 6 | p-Cresidine | Red orange. |
| 7 | N-dimethyl-p-cresidine | Scarlet. |
| 8 | 2,5-dimethoxy-aniline | Orange. |
| 9 | 2,5-dimethoxy-N-dimethylaniline | Red orange. |
| 10 | N-monoacetyl-m-phenylenediamine | Orange. |
| 11 | N-methyl-diphenylamine | Scarlet. |
| 12 | m-Methoxy-diphenylamine | Brick red. |
| 13 | 6-amino-indazole | Orange. |
| 14 | β-Naphthylamine | Scarlet. |
| 15 | Phenol | Yellow. |
| 16 | Resorcinol | Golden yellow. |
| 17 | 3-methyl-5-pyrazolone | Greenish yellow. |
| 18 | 3'-chloro-1-phenyl-3-methyl-5-pyrazolone | Yellow. |
| 19 | 4'-chloro-1-phenyl-3-methyl-5-pyrazolone | Do. |
| 20 | 1-phenyl-3-ethoxycarbonyl-5-pyrazolone | Golden yellow. |
| 21 | 1-phenyl-3-carbamoyl-5-pyrazolone | Do. |
| 22 | 6-acetylacetylamino-2-phenyl-benzothiazole. | Greenish yellow. |
| 23 | β-Naphthol | Orange. |
| 24 | 3-ethoxycarbonyl-2-naphthol | Scarlet. |
| 25 | 3-carbanilido-2-naphthol | Red. |
| 26 | 3-hydroxy-diphenylamine | Brick red. |
| 27 | 3-N-ethylamino-4-methyl-phenol | Orange. |

We claim:
Basic azo dyestuffs of general formula:

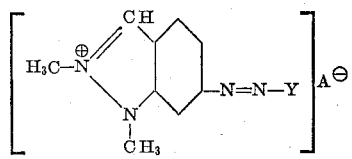

in which Y represents a member selected from the group consisting of p-amino-phenyl, monohydroxyphenyl, dihydroxyphenyl, monoalkoxy-p-aminophenyl, dialkoxy-p-aminophenyl, monoalkyl - p - aminophenyl, dialkyl - p-aminophenyl, acetylamino - p - aminophenyl, N - alkyl-p - aminophenyl, N,N - dialkyl - p - aminophenyl, N-phenyl-p-aminophenyl, N-alkyl N-phenyl-p-aminophenyl, p-cresidine, 2,5-dimethoxy-N-dimethylaniline, 6-amino-7-indazolyl, 2-amino-naphthyl, 5-oxo-4-pyrazolyl, 3-methyl-5 - oxo - 4 - pyrazolyl, 1 - phenyl - 3 - methyl - 5 - oxo-4 - pyrazolyl, 1 - (chlorophenyl) - 3 - methyl - 5 - oxo-4 - pyrazolyl, 1 - phenyl - 3 - alkoxycarbonyl - 5 - oxo-pyrazolyl, 1 - phenyl - 3 - carbamoyl - 5 - oxo - 4 - pyrazolyl, N - (2' - phenylbenzothiazolyl) - 1 - carbamoyl-propane - 2 - one - 1 - yl, 2 - hydroxynaphthyl, 3 - alkoxycarbonyl-2-hydroxy-naphthyl, said alkyl and alkoxy groups having 1 to 2 included carbon atoms and A represents chloride or sulphate.

References Cited by the Examiner

UNITED STATES PATENTS

| | | |
|---|---|---|
| 2,795,575 | 6/1957 | Sureau et al. _____ 260—157 X |
| 2,893,816 | 7/1959 | Tsang et al. _____ 260—157 X |
| 2,913,303 | 11/1959 | Baumann et al. _____ 8—55 |
| 3,121,710 | 2/1964 | Sureau et al. _____ 260—46 |
| 3,148,180 | 9/1964 | Straley et al. _____ 260—158 |
| 3,161,631 | 12/1964 | Straley et al. _____ 260—158 |

FOREIGN PATENTS 1,211,449   10/1939   France.

CHARLES B. PARKER, *Primary Examiner.*

JOSEPH P. BRUST, *Examiner.*

REYNOLDS J. FINNEGAN, D. M. PAPUGA, *Assistant Examiners.*